(12) United States Patent
Kritt et al.

(10) Patent No.: US 9,135,335 B2
(45) Date of Patent: Sep. 15, 2015

(54) FILMSTRIP-BASED QUERY SUGGESTIONS

(71) Applicant: International Business Machines Corporation, Armonk, NY (US)

(72) Inventors: Barry Alan Kritt, Raleigh, NC (US); Sarbajit K. Rakshit, West Bengal (IN)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 13/691,933

(22) Filed: Dec. 3, 2012

(65) Prior Publication Data

US 2014/0156693 A1 Jun. 5, 2014

(51) Int. Cl.
*G06F 17/30* (2006.01)

(52) U.S. Cl.
CPC .... *G06F 17/30796* (2013.01); *G06F 17/30823* (2013.01)

(58) Field of Classification Search
CPC ............ G06F 17/30023; G06F 17/30047; G06F 17/30056; G06F 17/30058; G06F 17/3064; G06F 17/30696; G06F 17/3084; G06F 17/30843; G06F 17/30781
USPC ........ 707/722, 736, 740, 765, 767, 769, 770
See application file for complete search history.

(56) References Cited

U.S. PATENT DOCUMENTS

| 8,180,766 | B2 | 5/2012 | Yang et al. | |
|---|---|---|---|---|
| 8,364,660 | B2 * | 1/2013 | Delgo et al. | 707/706 |
| 8,392,435 | B1 * | 3/2013 | Yamauchi | 707/749 |
| 8,706,750 | B2 * | 4/2014 | Hansson et al. | 707/767 |
| 2009/0113475 | A1 | 4/2009 | Li | |
| 2010/0070523 | A1 | 3/2010 | Delgo et al. | |
| 2011/0078718 | A1 | 3/2011 | Jakobi et al. | |

OTHER PUBLICATIONS

Li et al., "ShotTagger: tag location for internet videos", ICMR '11 Proceedings of the 1st ACM International Conference on Multimedia Retrieval, Article No. 37, Apr. 2011, New York, NY, USA.

* cited by examiner

*Primary Examiner* — Cheryl Lewis
(74) *Attorney, Agent, or Firm* — Fleit Gibbons Gutman Bongini & Bianco PL; Thomas Grzesik (57) ABSTRACT

Various embodiments of the present invention present a search query suggestion to a user. In one embodiment a portion of a search query is received from a user. At least one search query suggestion is identified from a set of search query suggestions corresponding to the portion of the search query. At least one video frame is identified from at least video file associated with the at least one search query suggestion. The at least one search query suggestion and the at least one video frame is presented to the user.

17 Claims, 8 Drawing Sheets

| SEARCH SUGGESTION | VIDEO FILE IDENTIFIER | VIDEO FILE LOCATION | ⋮ |
|---|---|---|---|
| JANE DOE SONG A | VID_1  404 | N/A | ⋮ |
| | VID_2  406 | N/A | ⋮ |
| | VID_3  408 | N/A | ⋮ |
| | ⋮ | | ⋮ |
| | VID_N  410 | 412 LOCATION_A | ⋮ |
| ⋮ | | | |

FILMSTRIP-BASED QUERY SUGGESTIONS

BACKGROUND

The present invention generally relates to information searches, and more particularly relates to filmstrip based query suggestions for video searches.

Search engines have become useful tools in helping users find information of interest across the internet. Typically, when a user wishes to use a search engine, the user may input a search query into a search box. The user can then submit the search query, which can lead the user to a search results page of one or more search results corresponding to the query. The user may then be able to select one of the search results, in which the selection of the result may lead the user to a web page for browsing.

BRIEF SUMMARY

In one embodiment, a method for presenting a search query suggestion to a user is disclosed. The method comprises receiving a portion of a search query from a user. At least one search query suggestion is identified from a set of search query suggestions corresponding to the portion of the search query. At least one video frame is identified from at least video file associated with the at least one search query suggestion. The at least one search query suggestion and the at least one video frame is presented to the user.

In another embodiment, an information processing system for presenting a search query suggestion to a user is disclosed. The information processing system comprises a memory and a processor that is communicatively coupled to the memory. A search manager is communicatively coupled to the processor and the memory, and is configured to perform a method. The method comprises receiving a portion of a search query from a user. At least one search query suggestion is identified from a set of search query suggestions corresponding to the portion of the search query. At least one video frame is identified from at least video file associated with the at least one search query suggestion. The at least one search query suggestion and the at least one video frame is presented to the user.

In yet another embodiment, a computer program product for presenting a search query suggestion to a user is disclosed. The computer program product comprises a storage medium readable by a processing circuit and storing instructions for execution by the processing circuit for performing a method. The method comprises receiving a portion of a search query from a user. At least one search query suggestion is identified from a set of search query suggestions corresponding to the portion of the search query. At least one video frame is identified from at least video file associated with the at least one search query suggestion. The at least one search query suggestion and the at least one video frame is presented to the user.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
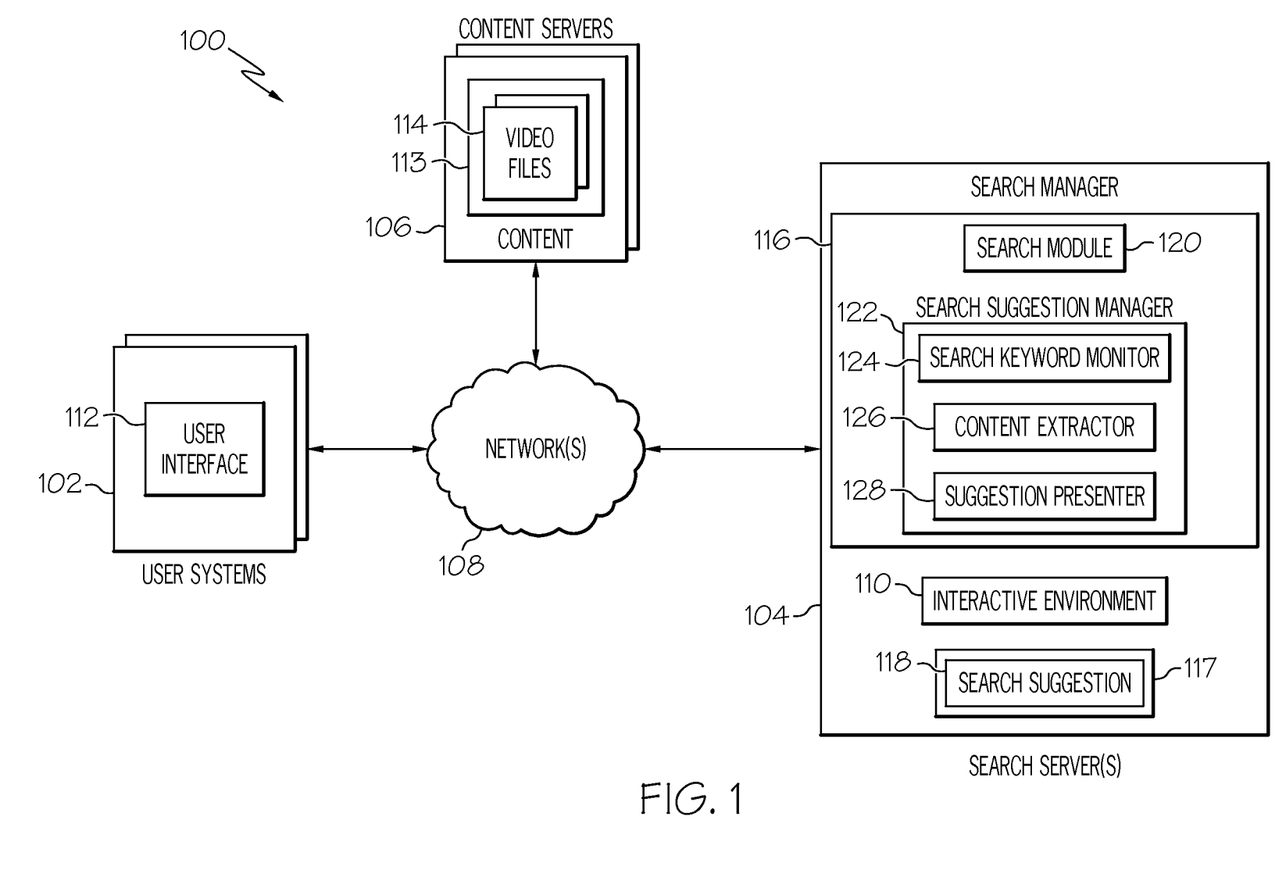
FIG. 1 is a block diagram illustrating one example of an operating environment according to one embodiment of the present invention.

FIG. 1 illustrates one example of an operating environment according to one embodiment of the present invention. In particular, FIG. 1 shows a plurality of information processing systems 102, 104, 106 communicatively coupled to one or more networks 108. For example, one or more user systems 102, search servers 104, and content servers 106 are communicatively coupled to the network(s) 108. Users access/interact with an interactive environment 110 provided by the search server 104 via a user interface 112 or programmatically via an application programming interface(s) (API). Examples of the user interface 112 are a web browser, an application, etc. The interactive environment 110, in one embodiment, is a web page, application, service, etc., that allows a user to search for information/content 113 such as video files 114 or other web content (e.g., websites and their web pages) hosted by the content servers 106.

The search server 104, in one embodiment, comprises a search manager 116 and a repository 117 of search suggestions 118. The search manager 116 comprises a search module 120 and a search suggestion manager 122. The search manager 116 is configured to receive search queries, or portions of search queries, submitted by a user via the interactive environment 110. The search module 120 of the search manager 118 performs one or more searches for content 113 at the content server(s) 106 based on the search queries or portions thereof. The search module 120, in one embodiment, searches indexes (not shown) created from the content 113 residing at the content server(s) 106 and/or searches the actual content 113.

The search suggestion manager 122, in one embodiment, comprises a search keyword monitor 124, a content extractor 126, and a suggestion presenter 128. The search suggestion manager 122 is configured to perform auto-complete functions/operations that suggest a list of most likely query suggestions in response to the currently typed-in portion of a search query by the user. A query suggestion, in one embodiment, is a complete search query that is suggested to a user based on his/her partially inputted search keyword/phrase. These likely query suggestions, in one embodiment, are obtained from the repository of query suggestions 117 stored in the search server 104. It should be noted that the search suggestions 118 can also be stored at one or more additional locations as well. The search suggestion manager 122 and its components are discussed in greater detail below.

Filmstrip-Based Query Suggestions

As discussed above, the search manager 116 is configured to provide search query/term suggestions to a user based on the currently typed-in portion of a search query by the user. The search query/term suggestions can be provided for any type of searchable content such as, but not limited to, video files, audio files, web pages, etc. Therefore, even though the following discussion uses video content/files as one example of searchable content, embodiments of the present invention are not limited to such content.

Figure 2:
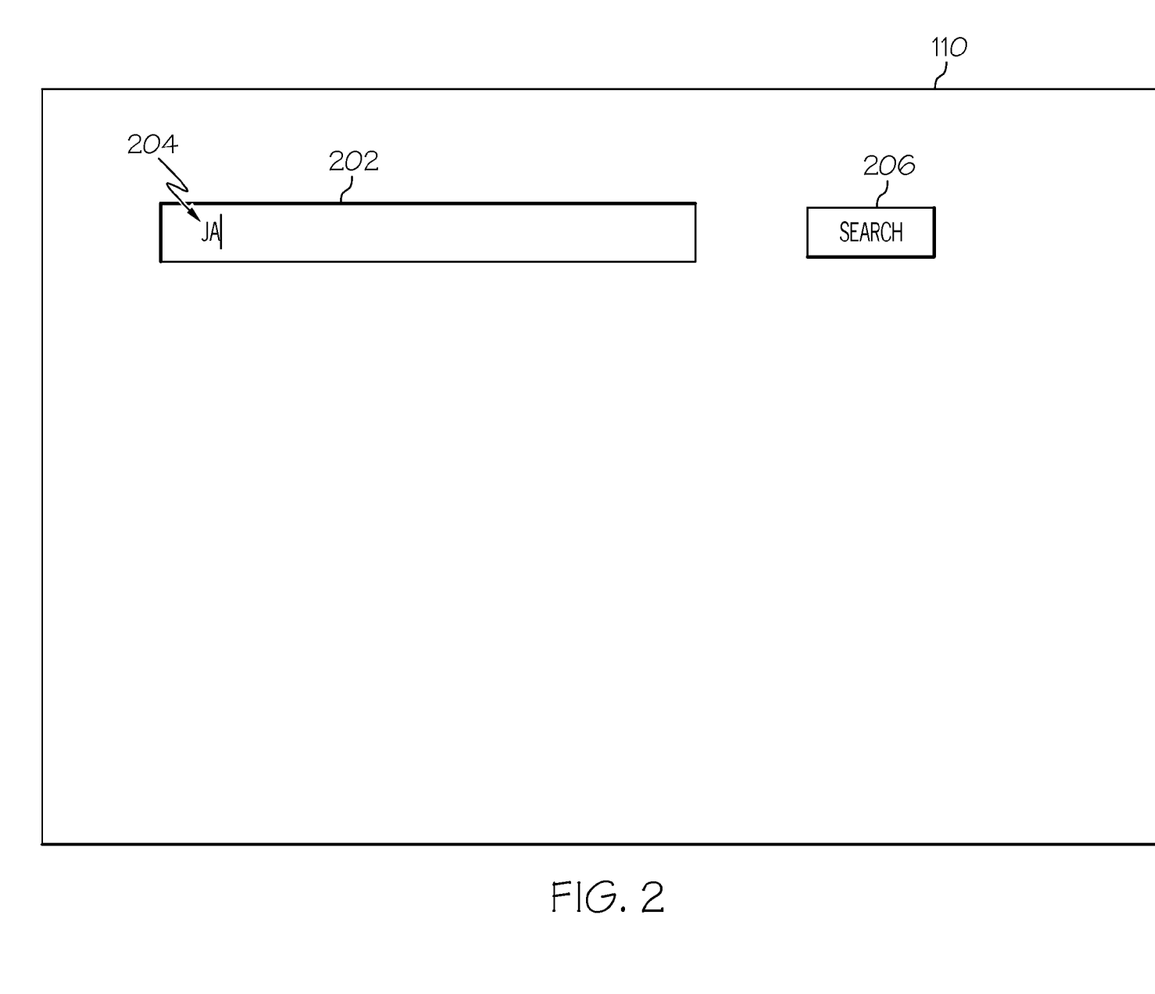
FIG. 2 illustrates one example of an interactive environment for entering information search queries according to one embodiment of the present invention.

FIG. 2 shows one example of the interactive environment 110 provided by the search server 104. In this example, at least one portion 202 such as a search box of the interactive environment 110 allows a user to enter information search terms/keywords. As a user begins typing a search query 204 in the search box 202, each character (or multiple characters) is communicated to the search server 104 as they are inputted into the search box 202. In this embodiment, the inputted characters are communicated to the search server 104 prior to the user submitting (e.g., selecting a submit widget 206) the search query in its entirety to the search server 104. For example, FIG. 2 shows that the user has entered the characters "Ja" into the search box 202. In this embodiment, the characters "Ja" are communicated to the search server 104 prior to the user completing his/her entry of the search term(s) in its entirety.

The search keyword monitor 124 of the search suggestion manager 122 analyzes each received character individually and/or as a group, and compares these characters to the query suggestions 118 stored in the query suggestion repository 117. Based on this comparison, the search keyword monitor 124 identifies query suggestions 118 that match the characters at least within a given threshold. In one embodiment, the query suggestions 118 are search keywords/phrases that have been previously submitted by other users and/or the current user (e.g., user search history) to the search server 104. Each query suggestion 118 can be associated with a weight/rank based its popularity (e.g. number of submissions), relevancy (e.g., number of times users have accepted the suggestion), and/or the like. The search keyword monitor 124, in one embodiment, utilizes these weights/ranks to determine which query suggestions 118 to select. The weights/ranks can also be used by the suggestion presenter 128 to determine how to sort/organize the query suggestions 118 when presenting the suggestions 118 to a user. It should be noted that in another embodiment, the search keyword monitor 124 searches the Internet in real time to obtain query suggestions based on the characters entered by the user in the search box 202.

Figure 3:
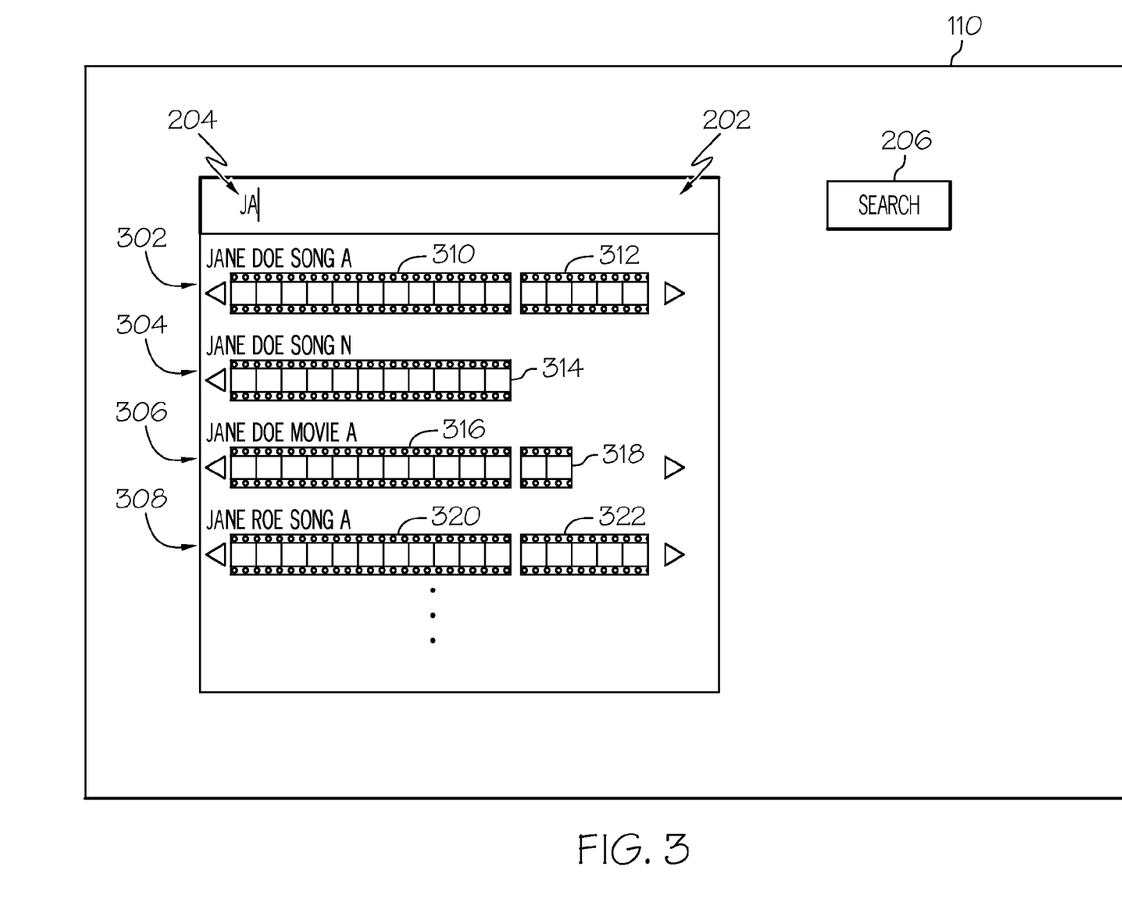
FIG. 3 illustrates the interactive environment of FIG. 2 where search query suggestions and associated filmstrips corresponding to one or more video files have been presented to a user according to one embodiment of the present invention.

For example, based on the characters "Ja" entered into the search box 202, the search keyword monitor 124 analyzes the search suggestion repository 117 to identify search suggestions 118 that correspond to the entered characters "Ja". Once a set of search suggestions 118 is identified, the suggestion presenter 128 presents the set of search suggestions to the user, as shown in FIG. 3. FIG. 3 shows a plurality of search suggestions 302, 304, 306, 308 associated with the characters "Ja" inputted into the search box 202. For example, a first search suggestion 302 includes the query terms "Jane Doe Song A". A second search suggestion 304 comprises the query terms "Jane Doe Song N". A third search suggestion 306 comprises the query terms "Jane Doe Movie A". A fourth search suggestion 308 comprises the query terms "Jane Roe Song A".

In addition to the displaying search suggestions to the user, the search manager 116 also displays one or more video frames of one or more video files associated with a presented query suggestion 302, 304, 306, 308. When multiple video frames are displayed for a given video file these multiple video frames are referred to as a "filmstrip". For example, FIG. 3 shows a first set of filmstrips 310, 312 being displayed for the first search suggestion 302, a second set of filmstrips 314 being displayed for the second search suggestion 304, a third set of filmstrips 316, 318 being displayed for the third search suggestion 306, and a fourth set of filmstrips 320, 322 being displayed for the fourth search suggestion 308.

Figure 4:
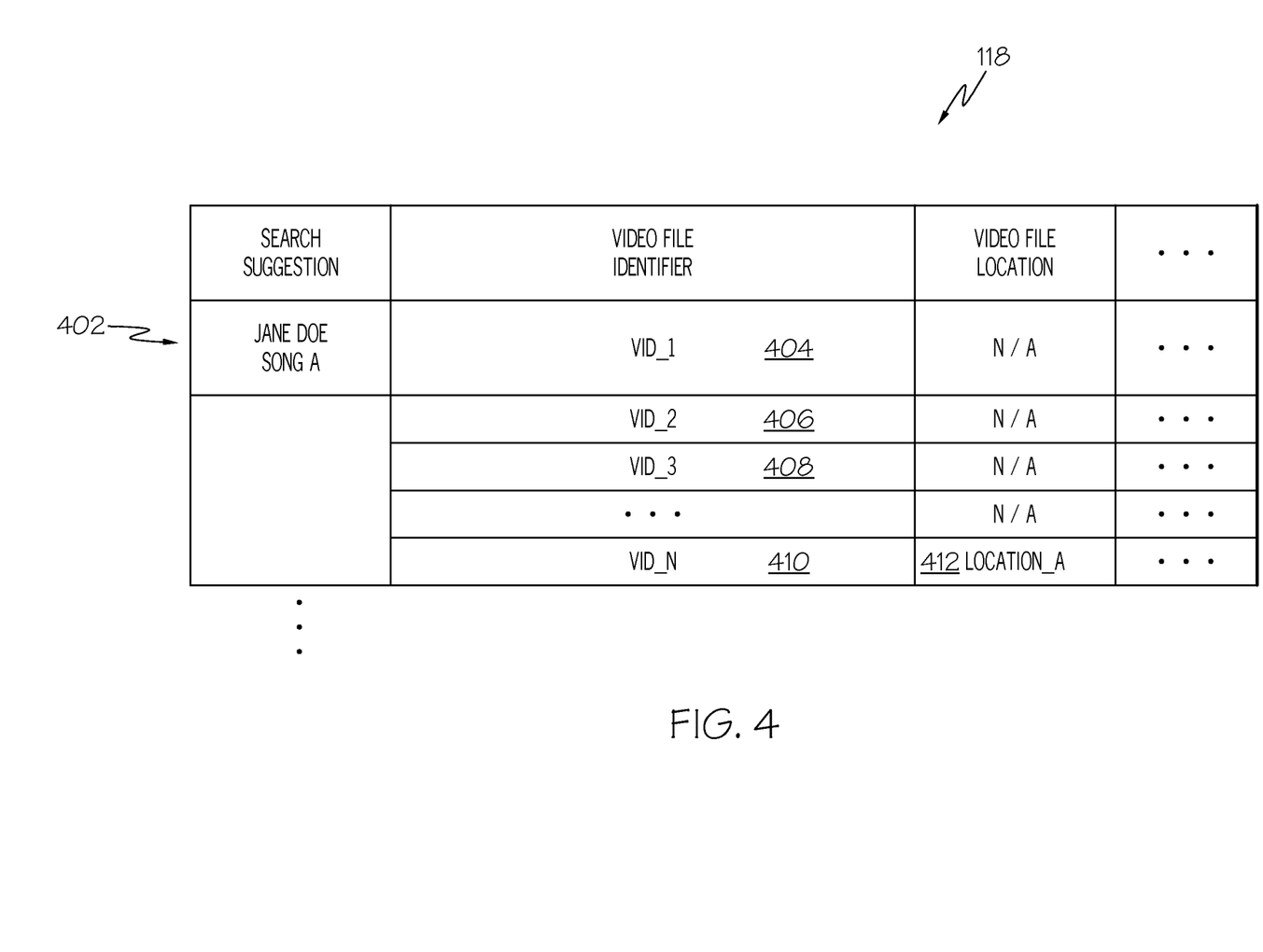
FIG. 4 illustrates one example of a search query suggestion entry according to one embodiment of the present invention.

Individual video frames or filmstrips for a given search suggestion are obtained from video files 114 associated with the search suggestion. In one embodiment, one or more search suggestions 118 stored within the search suggestion repository 117 are associated with one or more video files. In this embodiment, a search suggestion 118 is stored with at least an identifier of each video file associated with the search suggestion. An identifier can be any type of identifier such as (but not limited to) a location flag, file identifier, etc. that allows the video file to be identified and/or located. For example, FIG. 4 shows one example of a search suggestion entry 400 within the search suggestion repository 118. In the example shown in FIG. 4, the entry 402 comprises the search suggestion "Jane Doe Song A" and four identifiers 404, 406, 408, 410 each corresponding to a video file associated with the search suggestion "Jane Doe Song A". FIG. 4 also shows that optional video file location information 412 can be associated with the search suggestion entry as well. The file location information indicates the location where the corresponding video file is stored.

In another embodiment, the search suggestion manager 122 performs a search for video files 114 associated with an identified search suggestion such as "Jane Doe Song A" in addition to (or instead of) maintaining video file information associated with the search suggestion. In this embodiment, the search suggestion manager 122 utilizes the identified search suggestion such as "Jane Doe Song A" as a search query and searches for video files 114 that satisfy this query. For example, the search module searches the content servers 106 for video files 114 that are associated with "Jane Doe Song A".

When the search suggestion manager 122 has identified the video files 114 associated with a given search suggestion the context extractor 126 of the search suggestion manager 122 extracts one or more video frames from the identified video file 114. Frames can be extracted based on various extraction rules. For example, a given number of frames can be extracted or a given number of frames per a given interval of time can be extracted. Frames can be extracted based on their popularity as annotated by users. Also, publishers of the video files can mark specific frames for extraction. Once the video frames have been extracted the search suggestions 302, 304, 306, 308 and the frames/filmstrips 310 to 322 corresponding to the video files 114 associated with the search suggestions 302, 304, 306, 308 are presented to the user, as shown in FIG. 3.

In the example of FIG. 3 each filmstrip 310 to 322 (or standalone frame) corresponds to an individual video file 114. For example, a first filmstrip 310 corresponding to a first video file and a second filmstrip 312 corresponding to a second video file is presented to the user for the first search suggestion "Jane Doe Song A" 302. In one embodiment, the search suggestion presenter 128 organizes/sorts the frames/ filmstrips based on various factors. For example, frames/filmstrips can be organized based on their popularity (e.g., number of views), the ranking of the webpage/website hosting the video file, the relevance of the video file to the search suggestion, etc.

It should be noted that each filmstrip 310 to 322 (or standalone frame) can be associated with one or more additional frames (not shown) of the corresponding video file. For example, five minute video may be played at 24 frames per second for a total of 7200 frames. The search manager 116, in one embodiment, displays only a portion of these 7200 frames. Therefore, as the user places a pointer/cursor over (or selects) a given filmstrip 310 or individual frame the search manager 116 presents one or more additional frames associated with the given filmstrip 310 or individual frame to the user. This allows the user to drill-down to a more detailed view of the given filmstrip 310 or individual frame. Alternatively, the user is able to drill-up from a more detailed view to a higher level view as well. In another embodiment, if a filmstrip is presented for multiple videos with one frame per video the user can select any of these frames. The user can perform the drill-down operations discussed above on the individual frame. A filmstrip comprising multiple frames is then displayed to the user for the video file associated with the individual frame.

Figure 5:
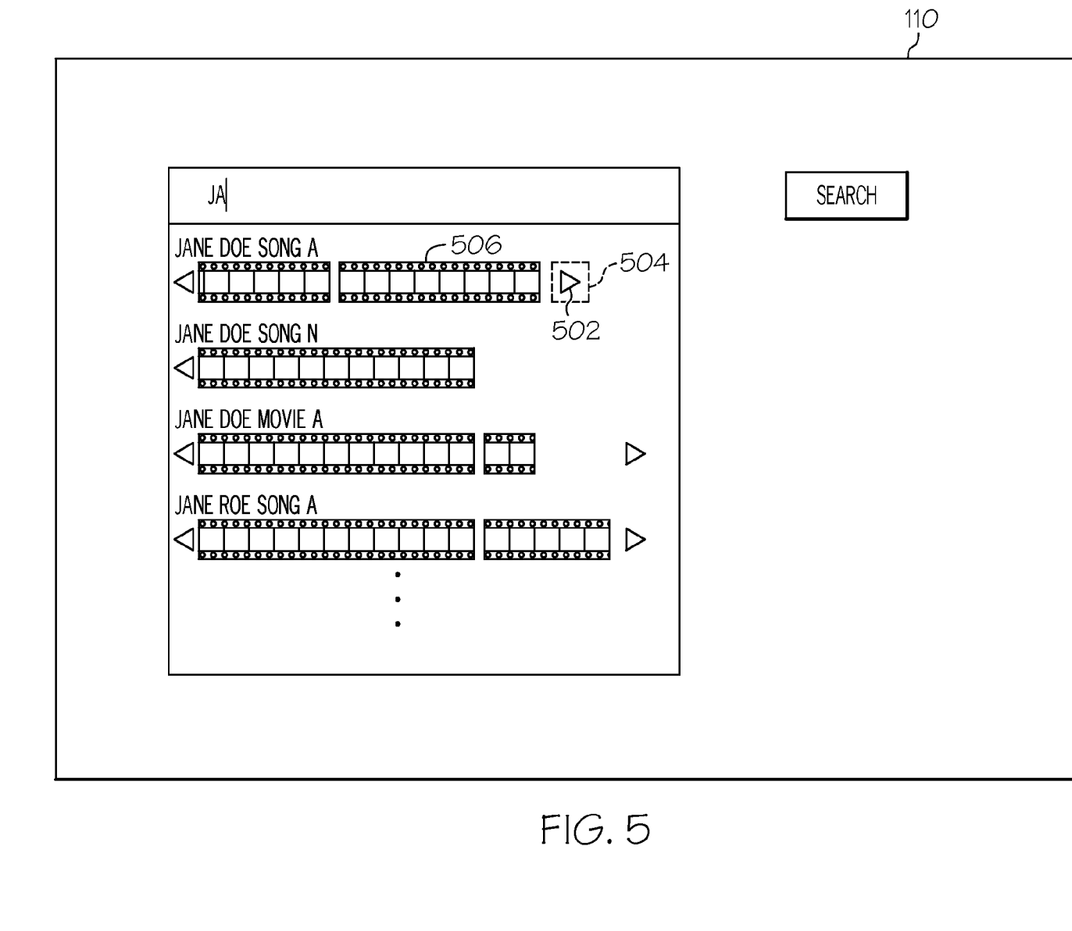
FIG. 5 illustrates the interactive environment of FIG. 3 where additional filmstrips associated with a given search query suggestion have been presented to a user according to one embodiment of the present invention.

In one embodiment, if the displayed search suggestion 302, 304, 306, 308 is associated with one or more frames/filmstrips currently not being displayed the user can select a widget or perform some other action to scroll the displayed frames/filmstrips. For example, FIG. 5 shows that the user has selected a widget 502 within the interactive environment 110, as indicated by the dashed box 504. This action results in a current view of the frames/filmstrips for the search suggestion to change so that one or more additional frames/filmstrips 506 are displayed to the user.

The displayed individual frames and/or one or more frames of a displayed filmstrip can comprise a snapshot from the corresponding video file associated with the frame. These snapshots, in one embodiment, are displayed to the user either individually and/or in sequence to provide a preview of the video file. For example, in one embodiment, as the user places a cursor or pointer over a frame a larger view of the video snapshot along with metadata associated with the snapshot and/or corresponding video file is displayed to the user.

Figure 6:
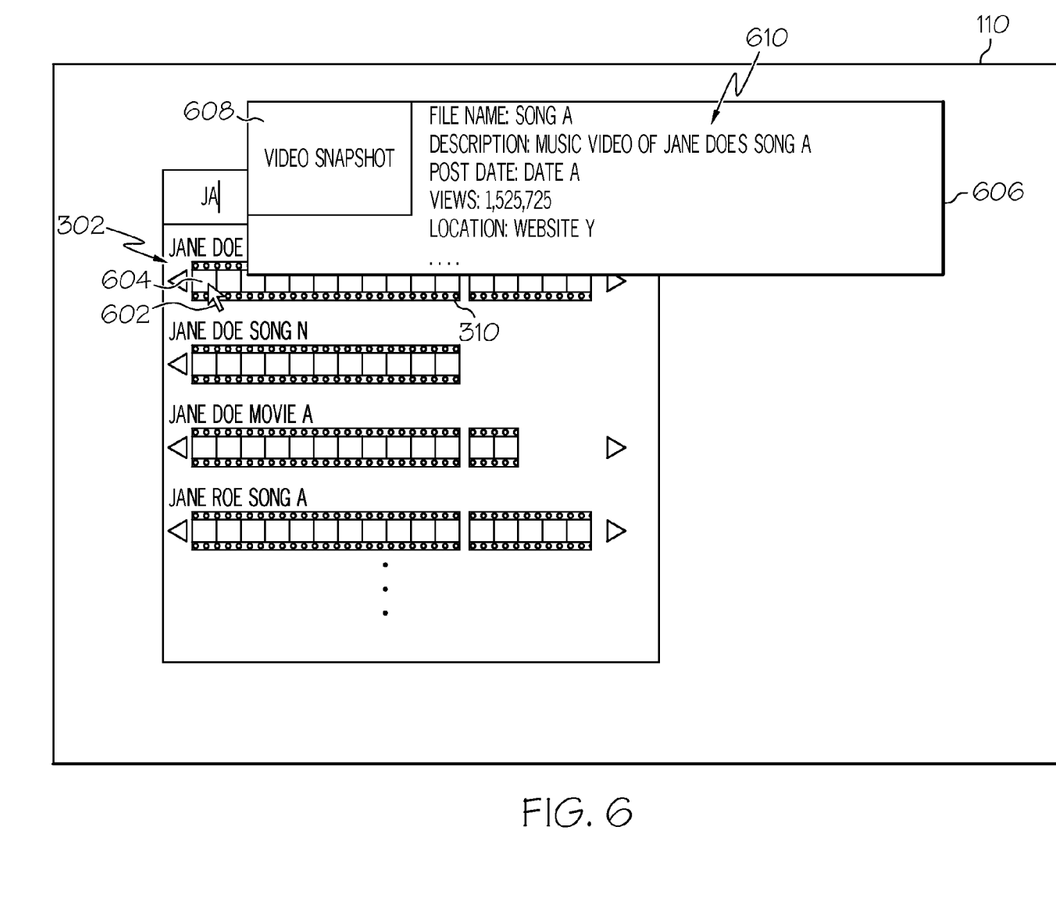
FIG. 6 illustrates the interactive environment of FIG. 3 where a video snapshot and metadata associated with a given filmstrip have been presented to a user based on according to one embodiment of the present invention.

For example, FIG. 6 shows that a user has placed a cursor 602 over a frame 604 of the first filmstrip 310 displayed for the first search suggestion 302. The search suggestion manager 116 detects this action performed by the user and displays a window 606 within the interactive environment 110 comprising a video snapshot 608 associated with the frame 604 along with metadata 610 associated with the corresponding video file. The metadata 610 comprises any information associated with the video file (and/or specific frame). For example, the metadata 610 can include the file name of the video file, a description of the video file, post or publish date of the video file, a view count associated with the video file, the location of where the video file is stored/hosted, etc. In another embodiment, a portion of the video can be displayed in the window. For example, if the user has placed the cursor over the filmstrip 310 the search suggestion manager 116 can place each of the video frames of the filmstrip within the window 610, or play another portion of the video file 114.

If the user selects a displayed frame or filmstrip 310, which can also be displayed as part of a drill-down or drill-up operation discussed above, the video file associated therewith is presented to the user. For example, the video file can be streamed and displayed to the user, downloaded and played locally on the user system, and/or the like. Alternatively, the user may click on the corresponding query suggestion (or any other query suggestion) and have the search module 120 search the internet as a whole for websites of interest. Alternatively, the user can complete his/her entry in the search box 202 and select the search widget 206 to have the search module 120 search the internet as a whole for websites of interest.

Operational Flow Diagram

Figure 7:
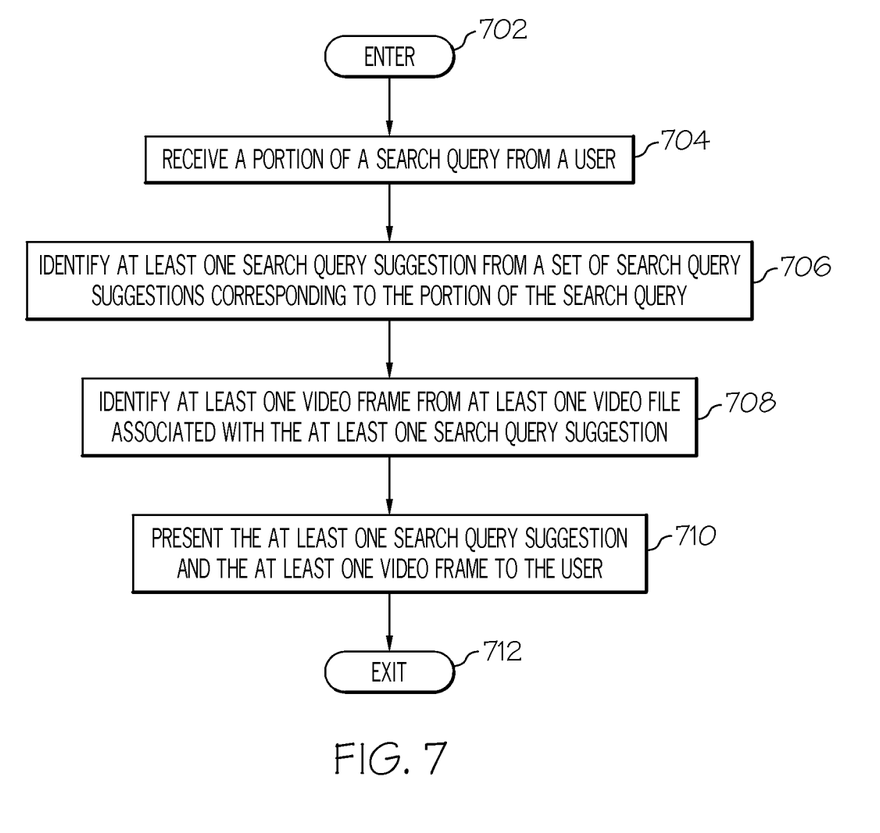
FIG. 7 is an operational flow diagram illustrating one example of presenting search query suggestions to a user according to one embodiment of the present invention.

FIG. 7 is an operational flow diagram illustrating one example of presenting search query suggestions to a user. The operational flow diagram of FIG. 7 begins at step 702 and flows directly to step 704. The search manager 124, at step 704, receives a portion of a search query 204 from a user. The search manager 124, at step 706, identifies at least one search query suggestion 302 from a set of search query suggestions 118 corresponding to the portion of the search query 204. The search manager 124, at step 708, identifies at least one video frame from at least video file 114 associated with the at least one search query suggestion 302. The search manager 124, at step 710, presents the at least one search query suggestion 302 and the at least one video frame to the user.

Information Processing System

Figure 8:
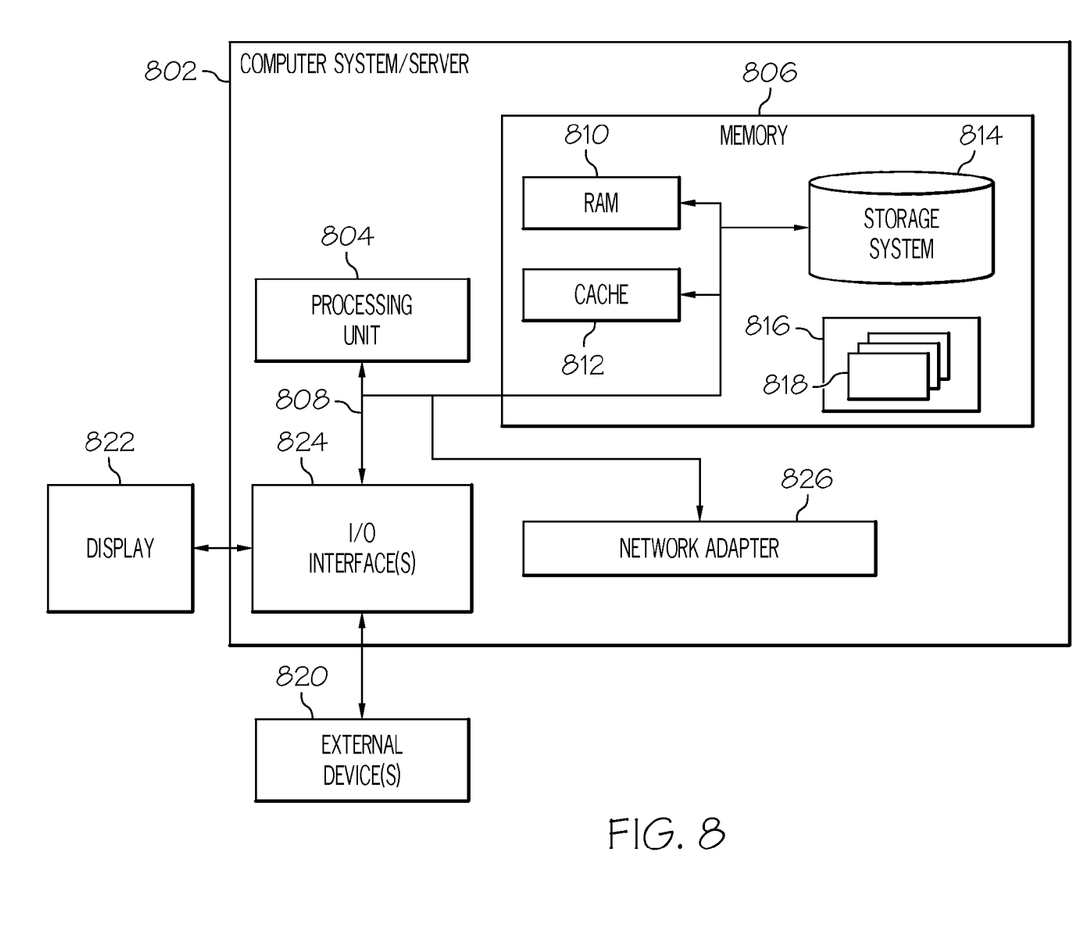
FIG. 8 is a block diagram illustrating a detailed view of an information processing system according to one embodiment of the present invention.

FIG. 8 illustrates one example of an information processing system that can be utilized in embodiments of the present invention. The information processing system 802 is based upon a suitably configured processing system configured to implement one or more embodiments of the present invention (e.g., the information processing system 102 of FIG. 1). Any suitably configured processing system can be used as the information processing system 802 in embodiments of the present invention. The components of the information processing system 802 can include, but are not limited to, one or more processors or processing units 804, a system memory 806, and a bus 808 that couples various system components including the system memory 806 to the processor 804.

The bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 8, the main memory 806 includes the search manager 116 and its components, the search suggestion repository 117, and the search suggestions 118. The search manager 116 (and its components) can also reside within the processor 804, or be a separate hardware component. The system memory 806 can also include computer system readable media in the form of volatile memory, such as random access memory (RAM) 810 and/or cache memory 812. The information processing system 802 can further include other removable/non-removable, volatile/non-volatile computer system storage media. By way of example only, a storage system 814 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. The memory 806 can include at least one program product having a set of program modules that are configured to carry out the functions of an embodiment of the present invention.

Program/utility 816, having a set of program modules 818, may be stored in memory 806 by way of example, and not limitation, as well as an operating system, one or more application programs (e.g., applications 108), other program modules, and program data. Each of the operating system, one or more application programs, other program modules, and program data or some combination thereof, may include an implementation of a networking environment. Program modules 818 generally carry out the functions and/or methodologies of embodiments of the present invention.

The information processing system 802 can also communicate with one or more external devices 820 such as a keyboard, a pointing device, a display 822, etc.; one or more devices that enable a user to interact with the information processing system 802; and/or any devices (e.g., network card, modem, etc.) that enable computer system/server 802 to communicate with one or more other computing devices. Such communication can occur via I/O interfaces 824. Still yet, the information processing system 802 can communicate with one or more networks such as a local area network (LAN), a general wide area network (WAN), and/or a public network (e.g., the Internet) via network adapter 826. As depicted, the network adapter 826 communicates with the other components of information processing system 802 via the bus 808. Other hardware and/or software components can also be used in conjunction with the information processing system 802. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for presenting a search query suggestion to a user, executed by a processor, the method comprising:
   receiving a portion of a search query from a user;
   identifying a first search query suggestion and at least a second search query suggestions from a plurality of search query suggestions corresponding to the portion of the search query;
   identifying
   at least one video frame from at least a first video file associated with the first search query suggestion, and
   at least one video frame from at least a second video file associated with the second search query suggestion; and
   presenting each of first and second search query suggestions, the at least one video frame identified for the first search query suggestion, and the at least one video frame identified for the second search query suggestion to the user.

2. The method of claim 1, wherein identifying a first search query suggestion and at least a second search query suggestion from a plurality of search query suggestions comprises:
   comparing the portion of the search query to the plurality of search query suggestions; and
   identifying, based on the comparing, the first and second search query suggestions, wherein the first and second search query suggestions comprise the portion of the search query.

3. The method of claim 1, wherein at least identifying the at least one video frame from the at least first video file comprises:
   determining that the at least one video file is associated with the first search query suggestion; and
   extracting the at least one video frame from the at least first video file.

4. The method of claim 1, further comprising:
   determining that the user has interacted with the at least one video frame associated with the first search query suggestion; and
   presenting, based on the determining, a set of information associated with the at least one video frame to the user.

5. The method of claim 4, wherein the set of information comprises at least one of:
   a video snapshot corresponding to the at least first video file; and
   a set of metadata associated with the at least first video file.

6. The method of claim 1, wherein the presenting further comprises:
   organizing the first and second search query suggestions based on at least one of:
   a popularity measurement associated with each of the first and second search query suggestions; and
   a relevancy metric associated with each of the first and second search query suggestions with respect to the portion of the search query.

7. The method of claim 1, wherein the presenting further comprises:
   organizing the video frame identified for the first search query suggestion and the video frame identified for the second search query suggestion with respect to one another based on at least one of:
   a popularity measurement associated with each of the first and second video files; and
   a relevance metric associated with each of the first and second video files with respect to the portion of the search query.

8. An information processing system for presenting a search query suggestion to a user, the information processing system comprising:
   a memory;
   a processor communicatively coupled to the memory; and
   a search manager communicatively coupled to the memory and the processor, wherein the search manager is configured to perform a method comprising:
   receiving a portion of a search query from a user;
   identifying at least one search query suggestion from a set of search query suggestions corresponding to the portion of the search query;
   identifying at least one video frame from at least video file associated with the at least one search query suggestion; and
   presenting the at least one search query suggestion and the at least one video frame to the user, wherein the presenting further comprises
   presenting at least two search query suggestions to the user organizing the at least two search query suggestions based on at least one of:
   a popularity measurement associated with each of the at least two search query suggestions; and
   a relevancy metric associated with each of the at least two search query suggestions with respect to the portion of the search query.

9. The information processing system of claim 8, wherein identifying at least one video frame from at least one video file comprises:
   determining that the at least one video file is associated with the at least one query suggestion; and
   extracting the at least one video frame from the at least one video file.

10. The information processing system of claim 8, wherein the method further comprises:
    determining that the user has interacted with the at least one video frame; and
    presenting, based on the determining, a set of information associated with the at least one video frame to the user.

11. The information processing system of claim 8, wherein presenting the at least one search query suggestion and the at least one video frame to the user comprises:
    presenting at least two sets of video frames to the user, wherein each of the two sets of video frames is associated with a different video file;
    organizing the at least two sets of video frames with respect to one another based on at least one of:
    a popularity measurement associated with each of the different video files; and a relevance metric associated with each of the different video files with respect to the portion of the search query.

12. A computer program storage product executed by a processor for presenting a search query suggestion to a user, the computer program storage product comprising instructions configured to perform a method comprising: receiving a portion of a search query from a user;
- identifying a first search query suggestion and at least a second search query suggestions from a plurality of search query suggestions corresponding to the portion of the search query;
- identifying
  - at least one video frame from at least a first video file associated with the first search query suggestion, and
  - at least one video frame from at least a second video file associated with the second search query suggestion; and
- presenting each of first and second search query suggestions, the at least one video frame identified for the first search query suggestion, and the at least one video frame identified for the second search query suggestion to the user.

13. The computer program storage product of claim 12, wherein identifying a first search query suggestion and at least a second search query suggestion from a plurality of search query suggestions comprises:
- comparing the portion of the search query to the plurality of search query suggestions; and
- identifying, based on the comparing, the first and second search query suggestions, wherein the first and second search query suggestions comprise the portion of the search query.

14. The computer program storage product of claim 12, wherein at least identifying the at least one video frame from the at least first video file comprises:
- determining that the at least one video file is associated with the first search query suggestion; and
- extracting the at least one video frame from the at least first video file.

15. The computer program storage product of claim 12, wherein the method further comprises:
- determining that the user has interacted with the at least one video frame associated with the first search query suggestion; and
- presenting, based on the determining, a set of information associated with the at least one video frame to the user.

16. The computer program storage product of claim 12, wherein the presenting further comprises:
- organizing the first and second search query suggestions based on at least one of:
  - a popularity measurement associated with each of the first and second search query suggestions; and
  - a relevancy metric associated with each of the first and second search query suggestions with respect to the portion of the search query.

17. The computer program storage product of claim 12, wherein the presenting further comprises:
- organizing the first and second search query suggestions based on at least one of:
  - a popularity measurement associated with each of the first and second search query suggestions; and
  - a relevancy metric associated with each of the first and second search query suggestions with respect to the portion of the search query.

\* \* \* \* \*